US012604801B2

(12) United States Patent
Yamaoka et al.

(10) Patent No.: US 12,604,801 B2
(45) Date of Patent: Apr. 21, 2026

(54) HANDLE AND SWITCH ASSEMBLY FOR A MOWER

(71) Applicant: Chervon (HK) Limited, Wanchai (HK)

(72) Inventors: Toshinari Yamaoka, Nanjing (CN); Fangjie Nie, Nanjing (CN); Haishen Xu, Nanjing (CN); Xiandian Shao, Nanjing (CN)

(73) Assignee: Chervon (HK) Limited, Wanchai (HK)

( * ) Notice: Subject to any disclaimer, the term of this patent is extended or adjusted under 35 U.S.C. 154(b) by 0 days.

(21) Appl. No.: 19/068,586

(22) Filed: Mar. 3, 2025

(65) Prior Publication Data

US 2025/0221342 A1     Jul. 10, 2025

Related U.S. Application Data

(63) Continuation of application No. 17/941,652, filed on Sep. 9, 2022, which is a continuation of application
(Continued)

(30) Foreign Application Priority Data

Oct. 15, 2012   (CN) .......................... 201210387914.9
May 3, 2013   (CN) ......................... 201220602040.X
(Continued)

(51) Int. Cl.
*A01D 69/10*          (2006.01)
*A01D 34/67*          (2006.01)
(Continued)

(52) U.S. Cl.
CPC ........... *A01D 34/824* (2013.01); *A01D 34/67* (2013.01); *A01D 34/6806* (2013.01);
(Continued)

(58) Field of Classification Search
CPC ................ A01D 34/67; A01D 34/6812; A01D 34/6818; A01D 34/006; A01D 34/78;
(Continued)

(56) References Cited

U.S. PATENT DOCUMENTS 3,357,716 A * 12/1967 Musichuk ............ A01D 34/824
16/437
3,696,593 A * 10/1972 Thorud ................. F02N 15/006
123/179.22
(Continued)

FOREIGN PATENT DOCUMENTS

CN          102232333 A      11/2011
CN          203872585 U      10/2014
(Continued)

OTHER PUBLICATIONS

International Search and Written Opinion of application No. PCT/CN22/101474, dated Sep. 7, 2022, 7 pp.
(Continued)

*Primary Examiner* — Adam J Behrens
(74) *Attorney, Agent, or Firm* — Greenberg Traurig, LLP

(57)          ABSTRACT

A gardening tool, such as a mower, has a main body having an accessory, such as a mowing blade, and a motor for driving the accessory. A handle is rotatably connected to the main body. At least one operation assembly is associated with the handle for being operated by a user to control the motor when the handle is located in a predetermined position. A control system prevents the motor from being controlled by the operation assembly and halts the motor when the handle is located out of the predetermined position.

20 Claims, 10 Drawing Sheets

Related U.S. Application Data

No. 17/570,032, filed on Jan. 6, 2022, which is a continuation of application No. 16/824,858, filed on Mar. 20, 2020, now Pat. No. 12,108,702, which is a continuation of application No. 16/670,821, filed on Oct. 31, 2019, now Pat. No. 11,606,900, which is a continuation of application No. 16/406,337, filed on May 8, 2019, now Pat. No. 10,485,176, which is a continuation of application No. 15/910,282, filed on Mar. 2, 2018, now Pat. No. 10,477,772, which is a continuation of application No. 15/250,476, filed on Aug. 29, 2016, now Pat. No. 10,070,588, said application No. 16/670,821 is a continuation-in-part of application No. 15/238,276, filed on Aug. 16, 2016, now Pat. No. 10,524,420, said application No. 15/250,476 is a continuation of application No. 14/511,490, filed on Oct. 10, 2014, now Pat. No. 9,596,806, said application No. 15/238,276 is a continuation of application No. 14/048,158, filed on Oct. 8, 2013, now Pat. No. 9,888,627.

(30) Foreign Application Priority Data

| Oct. 10, 2013 | (CN) | ......................... 201310468919.9 |
| Apr. 23, 2014 | (CN) | ......................... 201410167041.X |

(51) Int. Cl.

| | |
|---|---|
| *A01D 34/68* | (2006.01) |
| *A01D 34/82* | (2006.01) |
| *A01D 69/02* | (2006.01) |
| *A01D 101/00* | (2006.01) |

(52) U.S. Cl.

CPC ........... *A01D 34/828* (2013.01); *A01D 69/02* (2013.01); *A01D 69/10* (2013.01); *A01D 2034/6843* (2013.01); *A01D 2101/00* (2013.01)

(58) Field of Classification Search

CPC .... A01D 34/828; A01D 34/824; A01D 75/18; A01D 69/02; A01D 69/10; A01D 2101/00; A01D 2034/6843

See application file for complete search history.

(56) References Cited

U.S. PATENT DOCUMENTS

| | | | | | |
|---|---|---|---|---|---|
| 4,037,389 | A | * | 7/1977 | Harkness | ............... A01D 69/10 |
| | | | | | 56/11.3 |
| 4,041,679 | A | * | 8/1977 | Seifert | .................... F16D 67/02 |
| | | | | | 56/11.3 |
| 4,167,221 | A | * | 9/1979 | Edmonson | ........... B62D 51/001 |
| | | | | | 180/19.3 |
| 4,281,732 | A | * | 8/1981 | Hoch | ..................... B60K 28/14 |
| | | | | | 56/11.8 |
| 4,316,355 | A | * | 2/1982 | Hoff | ................... A01D 34/6812 |
| | | | | | 56/11.3 |
| 4,704,847 | A | * | 11/1987 | Greider | .............. A01D 34/6806 |
| | | | | | 56/11.3 |
| 4,757,885 | A | * | 7/1988 | Kronich | ............. A01D 34/6812 |
| | | | | | 477/200 |
| 5,138,824 | A | * | 8/1992 | Oshima | .............. A01D 34/6806 |
| | | | | | 56/11.8 |
| 5,146,735 | A | * | 9/1992 | McDonner | ......... A01D 34/6806 |
| | | | | | D15/18 |
| 5,155,985 | A | * | 10/1992 | Oshima | .............. A01D 34/6806 |
| | | | | | 56/10.8 |
| 5,195,307 | A | * | 3/1993 | Thorud | .............. A01D 34/6806 |
| | | | | | 56/11.8 |
| 5,343,678 | A | * | 9/1994 | Stuart | ................ A01D 34/6812 |
| | | | | | 56/11.6 |
| 5,511,367 | A | * | 4/1996 | Powers | .............. A01D 34/6806 |
| | | | | | D15/18 |
| 5,517,809 | A | * | 5/1996 | Rich | ................... A01D 34/6806 |
| | | | | | 56/2 |
| 5,558,210 | A | * | 9/1996 | Jonischus | .............. H01H 9/226 |
| | | | | | 200/321 |
| 5,692,366 | A | * | 12/1997 | Hardesty | ............... A01D 34/69 |
| | | | | | 180/6.66 |
| 6,082,083 | A | * | 7/2000 | Stalpes | .............. A01D 34/6806 |
| | | | | | 56/11.1 |
| 6,220,005 | B1 | * | 4/2001 | Plamper | .................... H01H 3/20 |
| | | | | | 56/10.8 |
| 6,644,002 | B2 | * | 11/2003 | Trefz | ................. A01D 34/6806 |
| | | | | | 56/10.8 |
| 6,945,133 | B2 | * | 9/2005 | Rush | .................... B62D 51/001 |
| | | | | | 56/10.8 |
| 7,240,756 | B2 | * | 7/2007 | Derby, V. | ............. A01D 34/824 |
| | | | | | 180/332 |
| 11,622,502 | B2 | | 4/2023 | Wei | |
| 11,638,397 | B2 | | 5/2023 | Burns, III | |
| 2007/0256401 | A1 | * | 11/2007 | Hibi | .................... A01D 34/824 |
| | | | | | 56/10.5 |
| 2010/0064650 | A1 | * | 3/2010 | McCane | .............. A01D 34/824 |
| | | | | | 56/10.8 |
| 2011/0126502 | A1 | * | 6/2011 | Pitman | .................... A01D 34/68 |
| | | | | | 56/10.8 |
| 2022/0279714 | A1 | | 9/2022 | Ro | |
| 2022/0346312 | A1 | | 11/2022 | Takahashi | |
| 2022/0408640 | A1 | | 12/2022 | Hiller | |
| 2023/0034760 | A1 | | 2/2023 | Fu | |
| 2024/0090373 | A1 | | 3/2024 | Hou | |

FOREIGN PATENT DOCUMENTS

| | | | | |
|---|---|---|---|---|
| CN | 104541737 | A | | 11/2016 |
| CN | 104114333 | B | | 3/2017 |
| CN | 105815028 | A | | 12/2017 |
| CN | 110103110 | A | | 8/2019 |
| CN | 110636754 | A | | 12/2019 |
| CN | 106171253 | B | | 6/2020 |
| CN | 111406498 | A | | 7/2020 |
| CN | 111492805 | A | | 8/2020 |
| CN | 107920467 | A | | 4/2021 |
| DE | 3926098 | A | * 2/1991 | ........ A01D 34/6818 |
| EP | 1106046 | A1 | * 6/2001 | ........ A01D 34/6806 |
| EP | 1695608 | A1 | * 8/2006 | .......... A01D 34/001 |
| GB | 2139329 | A | * 11/1984 | ........ A01D 34/6806 |
| GB | 2316458 | A | * 2/1998 | ........ A01D 34/6818 |
| JP | H06153651 | A | | 6/1994 |
| WO | 2021203646 | A1 | | 10/2021 |

OTHER PUBLICATIONS

Non-final Office Action from U.S. Appl. No. 17/854,815, dated Jun. 24, 2025, 11pp.

Non-final Office Action from U.S. Appl. No. 17/941,652, dated Jun. 20, 2025, 11pp.

\* cited by examiner

HANDLE AND SWITCH ASSEMBLY FOR A MOWER

CROSS REFERENCE TO RELATED APPLICATIONS

This application claims the benefit of is a continuation of U.S. application Ser. No. 17/570,032, filed Jan. 6, 2022, which is a continuation of U.S. application Ser. No. 16/824, 858, filed Mar. 20, 2020 (now U.S. Pat. No. 12,108,702), which is a continuation of U.S. application Ser. No. 16/670, 821, filed Oct. 31, 2019 (now U.S. Pat. No. 11,606,900) which is a continuation of U.S. application Ser. No. 16/406, 337, filed May 8, 2019 (now U.S. Pat. No. 10,485,176), which is a continuation of U.S. application Ser. No. 15/910, 282, filed Mar. 2, 2018 (now U.S. Pat. No. 10,477,772), which is a continuation of U.S. application Ser. No. 15/250, 476, filed Aug. 29, 2016 (now U.S. Pat. No. 10,070,588), which is continuation of U.S. application Ser. No. 14/511, 490, filed on Oct. 10, 2014 (now U.S. Pat. No. 9,596,806), which application claims the benefit of CN 201310468919.9, filed on Oct. 10, 2013, and CN 201410167041.X, filed on Apr. 23, 2014.

Through U.S. application Ser. No. 16/670,821, this application also claims the benefit of and is a continuation-in-part of U.S. application Ser. No. 15/238,276, filed on Aug. 16, 2016 (now U.S. Pat. No. 10,524,420), which is a continuation of U.S. application Ser. No. 14/048,158, filed Oct. 8, 2013 (now U.S. Pat. No. 9,888,627, which application claims the benefit of CN 201210387914.9, filed on Oct. 15, 2012, and CN 201220602040.X, filed on May 3, 2013.

Each of these priority applications is incorporated herein by reference in its entirety.

FIELD OF THE DISCLOSURE

The present disclosure relates generally to gardening tools, and more particularly to mowers.

BACKGROUND OF RELATED ART

A gardening tool such as a mower performs the tool function mainly in a way that a motor of a main body brings functional accessories (e.g., a blade) into operation. Generally speaking, such tools are characterized by higher power and movement of the functional accessories is characterized by high speed and high frequency, which therefore may bring certain hidden danger to an inattentive operator's safety. Currently danger is usually avoided by providing a longer handle to try and keep the operator far away from the main body. However, in order to conveniently receive the mower, the handle is received in a manner such as folding or rotating. In this way, it is possible that when the handle is in a received state and the user is too close to the main body, the user misoperates the switch and thereby starts the mower, whereupon the operator may place themselves into danger by getting too close to the main body.

The statements in this section merely provide background information related to the present disclosure and may not constitute prior art.

SUMMARY

In one aspect of the disclosure, a gardening tool includes: a main body at least having a functional accessory and a motor for driving the functional accessory; a handle rotatably connected to the main body and at least having one operation assembly for being operated by a user to control the motor when the handle is in a secure position; and a control system capable of preventing the motor from being controlled by the operation assembly and halting the motor meanwhile when the handle is out of the secure position.

Particularly, the gardening tool is a mower, wherein the motor is an electric motor and the functional accessory is a mowing blade.

The gardening tool, particularly a mower according to the present disclosure can control the motor and the functional accessory comprehensively according to the rotation position of the handle and the instant operation state of the handle. When the handle is in a state of abnormal use, even if the operation assembly on the handle for normally starting operation of the tool is misoperated, the motor and the functional accessory are not driven, and thereby ensure the user's safety and prevent occurrence of danger.

Further areas of applicability will become apparent from the description provided herein. It should be understood that the description and specific examples are intended for purposes of illustration only and are not intended to limit the scope of the present disclosure.

Figure 1:
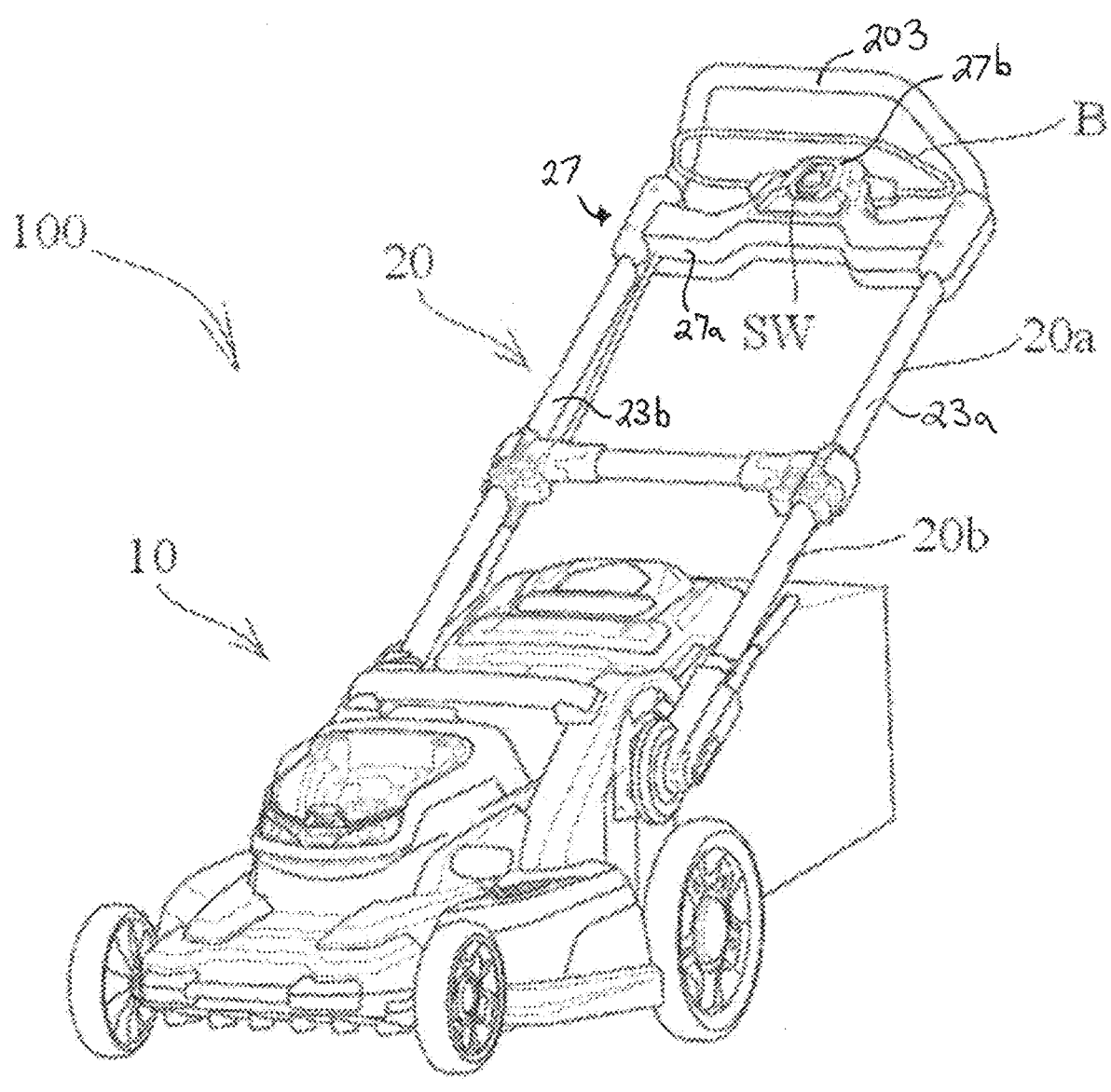
FIG. 1 is a schematic view of an exemplary gardening tool constructed according to the subject disclosure.

The drawings described herein are for illustrative purposes only of exemplary embodiments and not all possible implementations, and are not intended to limit the scope of the present disclosure. Corresponding reference numerals indicate corresponding parts throughout the several views of the drawings.

DETAILED DESCRIPTION

The following description of the preferred embodiments is merely exemplary in nature and is in no way intended to limit the invention, its application, or uses.

Referring to FIG. 1 through FIG. 10, as a preferred embodiment, a gardening tool according to the present invention is an electric mower 100.

The mower 100 comprises a main body 10, a handle 20 and a control system. The handle 20 is rotatably connected to the main body 10. The user may achieve accommodation by rotating the handle 20 to adjust an operation posture or reducing space occupied by the mower 100.

The main body 10 comprises a motor and a functional accessory. The functional accessory is used to perform the function of the tool. Regarding the mower 10, the functional accessory is a mowing blade. The motor functions to drive the functional accessory to move in a certain manner to achieve the tool function. Regarding the mower 100, the motor drives the functional accessory to rotate at a high speed. The following description is explained with the motor being an electric motor-which is not intended to be limiting.

To make the user have a comfortable and reliable operating experience, the handle 20 preferably comprises two handle bars. The ends of the handle bars close to the main body 10 are respectively connected to a rotation shaft 21 to achieve rotatable connection with the main body 10, and the ends away from the main body 10 are provided with an operation assembly therebetween. Regarding the mower 100, the operation assembly comprises a trigger B. By operating the trigger B, the user may achieve control of the mower 100 to start or stop the motor. Certainly, the operation assembly may also comprise other operating members such as a button.

The handle 20 at least comprises two telescopic tubes 20a, 20b. Specifically, one telescopic tube 20b forms a sleeve structure, and the other telescopic tube 20a is inserted into the telescopic tube 20b to form a slidable connection so that the telescopic tube 20a can achieve telescoping.

Figure 2:
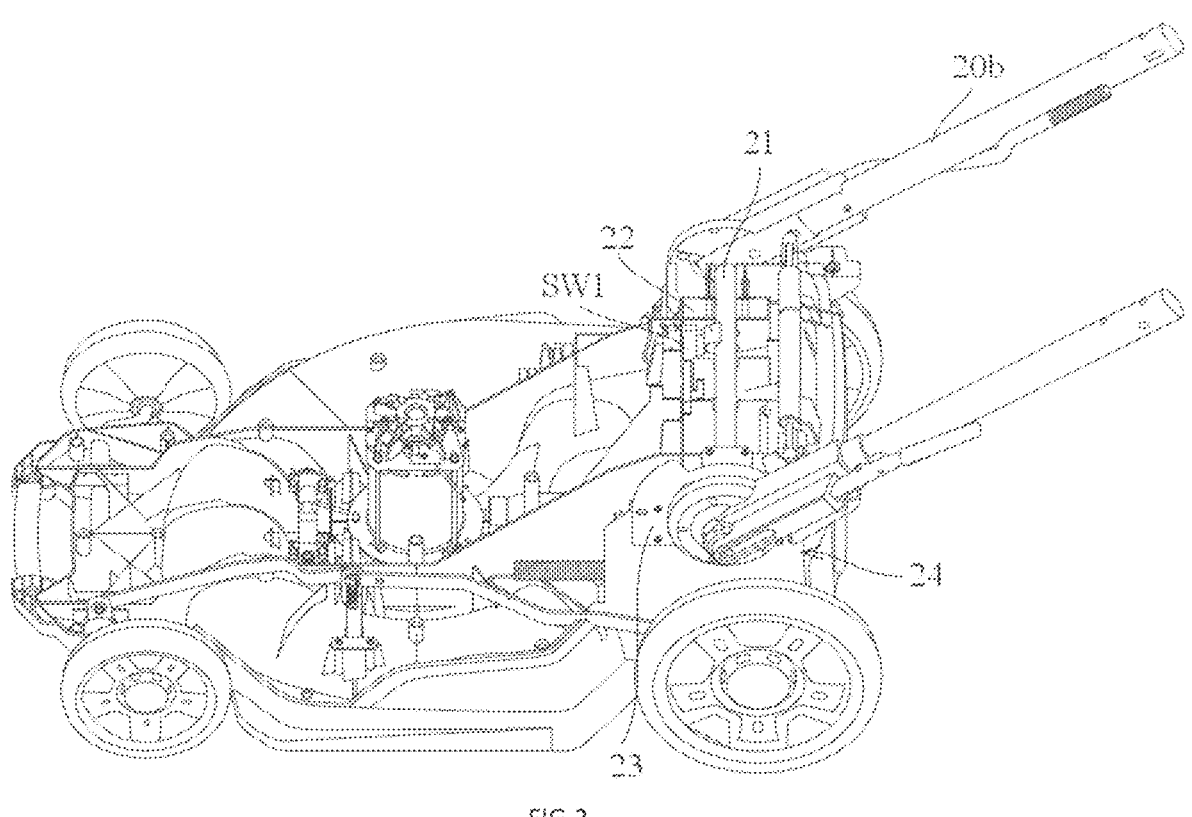
FIG. 2 is a partial schematic view of the tool of FIG. 1.
Figure 3:
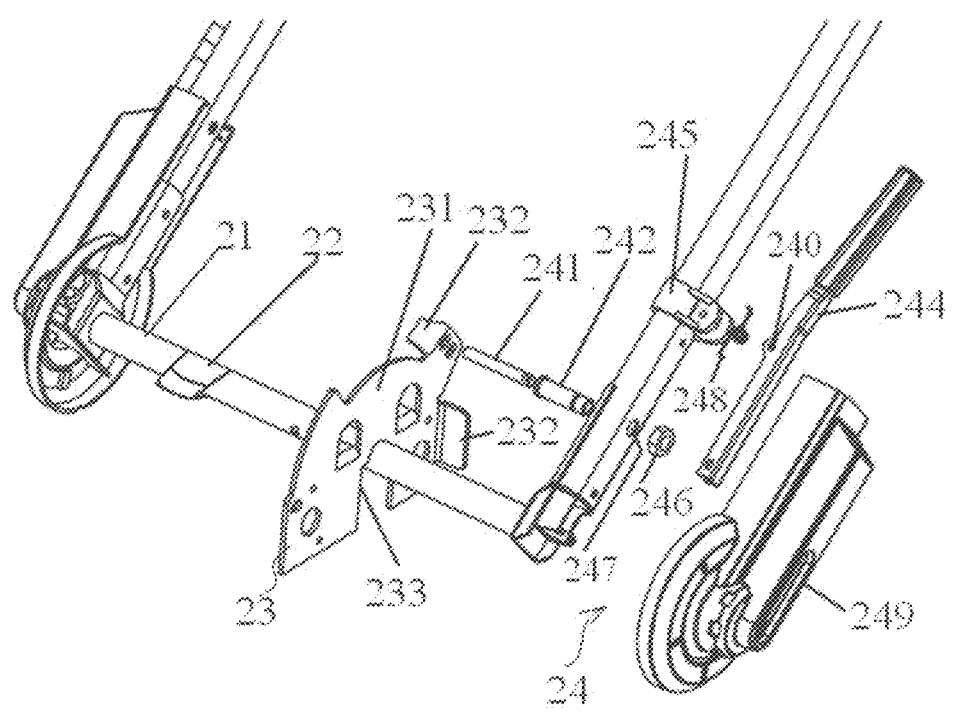
FIG. 3 is an exploded schematic view of a handle and its angle level mechanism of the tool of FIG. 1.
Figure 4:
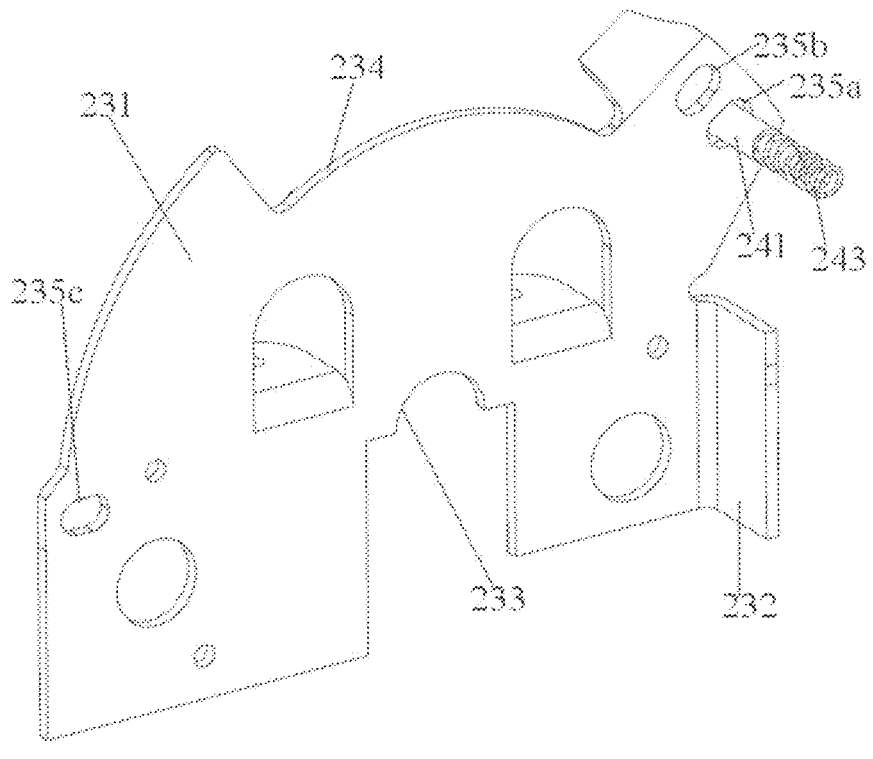
FIG. 4 is a schematic view of a level changing member of the tool of FIG. 1.
Figure 5:
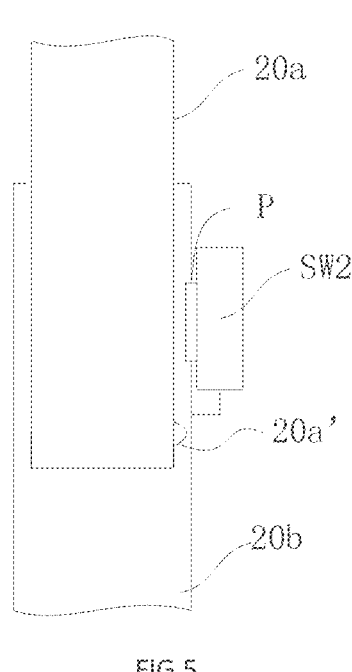
FIG. 5 is a schematic view illustrating that a telescopic tube does not extend to a designated position in the tool of FIG. 1.

In addition, in a preferred embodiment as shown in FIGS. 2, 3 and 5, in order to achieve adjustment of angle level when the handle 20 rotates, the angle level mechanism comprises a level changing member 23 and a locking mechanism 24 and is disposed at the rotation shaft 21 for connecting the handle 20 and the main body 10. The handle 20 is provided with the locking mechanism 24 which is automatically snap fitted with a plurality of levels of the level changing member 23 so as to fix and adjust the handle 20.

The level changing member 23 is used to set levels and cooperate with the locking mechanism to lock the levels. As a preferred embodiment, the level changing member 23 is a level change locking plate 231 which is in the shape of a plate structure. Certainly, the level changing member may take other forms such as a block shape. Besides, a mounting notch 233 is provided in a lower portion of the level change locking plate 231 so that the rotation shaft 21 will not be hindered upon rotating to change the level. Noticeably, the levels are a plurality of limiting holes 235a, 235b, 235c or an arcuate limiting notch 234 preferably formed on the level change locking plate 231, and the limiting holes 235a, 235b, 235c are located on the two sides of the limiting notch 234.

To better and flexibly adjust and fix the levels, the locking mechanism 24 comprises a level changing assembly for adjusting the levels and a control assembly for controlling the level changing assembly.

The level changing assembly comprises an automatic telescopic pin 241, a pin sleeve 242 and an elastic member 243, wherein the automatic telescopic pin 241 may cooperate with the limiting holes 235a, 235b, 235c and the limiting notch 234 to achieve level locking, the pin sleeve 242 is fixedly connected to an outer pipe 20b and sleeved around the outer periphery of the automatic telescopic pin 241 so as to constitute a slidable connection with the automatic telescopic pin 241, and the elastic member 243 may elastically eject the automatic telescopic pin 241 to the level of the level change locking plate 231 to achieve automatic locking of the level in the absence of an external force.

As a preferred solution, an end of the pin sleeve 242 fixedly connected to the outer pipe 20b is provided with external threads, and the outer pipe 20b is provided with a through hole 247 at the connection between the pin sleeve 242 and the outer pipe 20b. The through hole 247 is internally processed to form internal threads for mating with the external threads of the pin sleeve 242, so that the pin sleeve 242 is fixedly connected with the outer pipe 20b. Certainly, other methods may also be employed: for example, the portion of the pin sleeve 242 provided with external threads passes through the outer pipe 20b and then is fixedly connected with a nut 246 so as to fixedly connect the pin sleeve 242 and the outer pipe 20b.

To enable the automatic telescopic pin 241 to automatically cooperate with the levels better, a pin limiting structure is formed on the automatic telescopic pin 241, a sleeve limiting structure is formed on the pin sleeve 242, and the elastic member 243 is located between the pin limiting structure and the sleeve limiting structure. Preferably, the elastic member 243 is a spiral spring, the pin limiting structure is an annular step formed on an outer periphery of the automatic telescopic pin 241, and the sleeve limiting structure is an annular step formed in the pin sleeve 242. As such, one end of the spiral spring abuts against the pin limiting structure, and the other end abuts against the sleeve limiting structure so that the automatic telescopic pin 241 tends to move towards the level of the level changing member to achieve automatic level locking.

Upon level change operation, the automatic telescopic pin 241 needs to retreat out of a level and move, whereby the control assembly is needed to bring the automatic telescopic pin 241 to move.

The control assembly comprises an operation member 244 and a fixing member 245, wherein the operation member 244 is an executing member used by the operator to achieve level adjustment, and the operation member 244 is provided with an anti-skid structure at an end thereof to be manually held so that that the operator may control the operation member 244 more reliably. The automatic telescopic pin 241 passes through the pin sleeve 242 and the outer pipe 20b and is rotatably connected to the other end of the operation member 244. Preferably, a shaft hole is formed at the connection between the automatic telescopic pin 241 and the operation member 244, and a shaft is inserted into the shaft hole to rotatably connect the automatic telescopic pin 241 and the operation member 244.

The fixing member 7 is fixedly connected to the outer pipe 20b provided with the through hole 247, and the operation member 244 is rotatably connected to the fixing member 245. To allow for rotatable connection between the operation member 244 and the fixing member 245, as a preferred solution, a connection shaft hole 240 is formed on both the fixing member 245 and the operation member 244, and upon installation, a rotation shaft is inserted into the connection shaft hole 240 to form the rotatable connection. The resultant rotatable connection is not only firm and reliable, but also simple in structure and easy to install. As such, the operation member 244 is formed as a lever with a location for connection with the fixing member 245 as a pivot point. When an external force drives the anti-skid handle of the operation member to approach the outer pipe 20, the automatic telescopic pin 241, due to the action of the operation member 244, is forced to move away from the level changing member and retract out of the level to get ready for level adjustment.

To further improve convenience in use, the operation assembly further comprises a return member 248 enabling the operation member 244 to return automatically in the absence of an external force. Preferably, the return member 248 may be a torsion spring sleeved around the outer periphery of the rotation shaft. One end of the torsion spring abuts against the operation member 244, and the other end thereof abuts against the fixing member 7 or the outer pipe 20b fixedly connected to the fixing member 245. Therefore, in the absence of the external force, elastic energy of the torsion spring drives the operation member 244 to achieve automatic return. Certainly, the return member 248 here may also be designed based on magnetic energy, which is a readily-envisaged variation and not detailed herein.

The above depictions have introduced a multi-level operation handle mechanism capable of achieving automatic level change conveniently and reliably. A protective cover 249 is mounted outside the outer pipe 20b mounted with the pin sleeve 242 to protect the multi-level operation handle mechanism and the mower and provide a more pleasant and compact appearance.

To make the level change locking plate 231 more firmly fixed to a main body of the mower, the level change locking plate 231 bends and extends in a direction parallel to the rotation shaft 21 to form a stopping structure 232. The main body of the mower is provided with a mounting structure for cooperating with the stopping structure 232. The mounting structure may be, but need not be limited to, a groove integrally formed with the main body of the mower and configured to accommodate the stopping structure 232. As such, the level change locking plate 231 is fixed on the main body of the mower via screws. Furthermore, the cooperation of the stopping structure 232 and the mounting structure can effectively prevent displacement and ensure very reliable installation and limiting of the stopping structure 232 and the mounting structure.

As a preferred embodiment, the levels comprise limiting holes 235a, 235b, 235c and a limiting notch 234, wherein there are three limiting holes with two of them being adjacent to each other and located on the same side of the limiting notch 14. A first height level 235a and a second height level 235b are used to adjust the height of the operation handle upon normal use of the mower to meet the needs of different user groups with different heights, and the remaining limiting hole 235c is arranged on the other side of the limiting notch 234 and used as an accommodating level for folding the handle upon accommodating the mower. The limiting notch 234 is a movable level having an arc-shaped end and allowing the automatic telescopic pin 241 to move upon grass dumping operation.

The control system is used to ensure security when the user is using the mower 100, and it at least can lock the motor so that the motor is not controlled by the operation assembly when the handle 20 does not rotate to a designated position, thus the motor remains in a stop state and not started.

The advantage of this configuration is that when the handle 20 does not rotate to the designated position (generally a working position of the handle 20, the position of the handle 20 in FIG. 1), it can be ensured that even though the user misoperates the operation assembly, e.g., inadvertently pulls the trigger B, the motor is locked and cannot be started, thereby preventing accidental movement from causing injury to the user's body. That is because when the handle 20 does not rotate to the designated position, the user has not gotten ready for mowing and he might be in a dangerous position and vulnerable to injury.

In consideration of the above and in order to consider all possible risks upon use of the mower to provide security and protection to the user, the control system comprise at least two control devices, wherein one control device can control the motor only when the remaining control devices all are in a designated state.

As such, only when the control devices responsible for monitoring risk items all are in a designated state corresponding to absence of danger can the control device in the control system initiatively controlled by the user be unlocked to achieve its function. If one control device responsible for monitoring risk items is in a state corresponding to presence of danger, it locks the control device in the control system initiatively controlled by the user so that the user cannot start the motor, and stops the running motor and functional accessory in case that the motor is running.

Preferably, the control system comprises a first control device controlled by the user via the operation assembly. The first control device can be operated by the user to start the motor only when the remaining control devices in the control system all are in the designated state. The first control device is a user end control device that can be locked by any other control devices responsible for monitoring risk items in the control system.

The first control device may comprise a first switch or a first signal source device, or a combination thereof.

Generally, to achieve control of the user end, only one first switch or one first signal source device is needed. However, for the sake of security, to make sure that the user's operation is indeed intended to start the mower 100 and ensure safety, the first control device comprises a plurality of first switches and a plurality of first signal source devices, preferably two first switches, wherein one first switch is a contact switch that can be triggered by the trigger B and connected in series in a power supply circuit of the motor, and the motor is not powered when it is switched off, and it switches on the circuit when it is triggered by the trigger B. The other first switch is a position switch which is also connected in series in the power supply circuit of the motor, and it switches on the circuit when it detects that the trigger B moves to a corresponding position. As such, security guarantee may be increased by determining double control.

Certainly, one first signal source device may be set. This first signal source device may be a photoelectric switch which participates in control by sending a control signal to the switch in the power supply circuit. The photoelectric switch may be used to detect the user's operation action or detect whether there is an obstacle in an advancement direction of the mower 100.

Preferably, the first switch is one of a contact switch, a proximity switch, a Hall switch and a photoelectric switch, and the first signal source device is one of a contact switch, a proximity switch, a Hall switch and a photoelectric switch.

Referring to FIG. 1, as the simplest solution, the first control device only comprises one first switch which is connected in series in the power supply circuit. The first switch is a contact switch SW that can be controlled by the trigger B. The handle 20 comprises a first connecting rod 23a connected to the main body 10, a second connecting rod 23b connected to the main body 10, a cylindrical grip portion 203 connected to both the first connecting rod 23a and the second connecting rod 23b at a rear end of the handle 20 and extending therebetween. A connection device 27 comprising a transverse connection portion 27a connecting the first connecting rod 23a and the second connecting rod 23b extending between the first connecting rod 23a and the second connecting rod 23b and being separate from the grip portion 203 and proximately located to the grip portion 203. A lateral protrusion portion 27b extends from the transverse connection portion 27a.

The risk items monitored by the control device may comprise: an angle of the handle relative to the main body, telescopic situations of the telescopic tubes, electric power source temperature, motor temperature and blocked rotation.

When the angle of the handle relative to the main body is taken as the risk item to be monitored, the control system comprises a second control device that can be controlled by the handle according to its rotation. When the handle rotates to a designated position relative to the main body, the second control device unlocks the first control device so that the first control device can start the motor, and when the handle rotates to a position other than the designated position relative to the main body, the second control device locks the first control device so that the first control device cannot start the motor.

The second control device comprises a second switch or a second signal source device, or a combination thereof. The second switch is connected in the power supply circuit, and the second signal source device can send a control signal to the power supply circuit.

The second switch is one of a contact switch, a proximity switch, a Hall switch and a photoelectric switch; and the second signal source device is one of a contact switch, a proximity switch, a Hall switch and a photoelectric switch.

Figure 7:
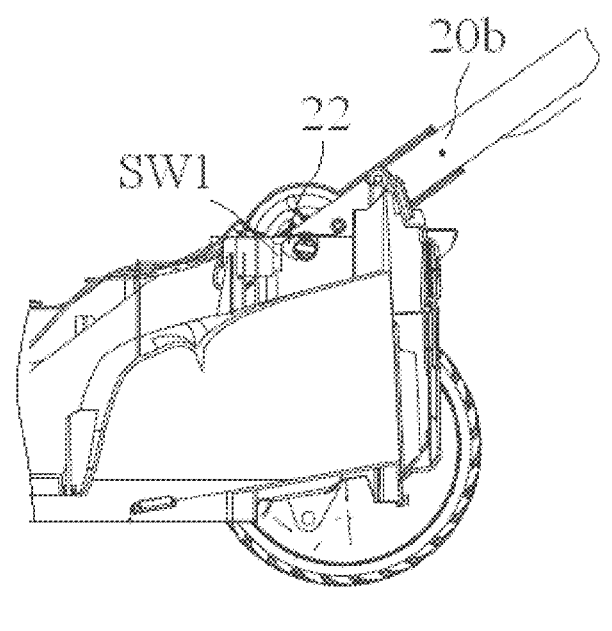
FIG. 7 is a schematic view illustrating that a handle rotates to a designated position in the tool of FIG. 1.
Figure 8:
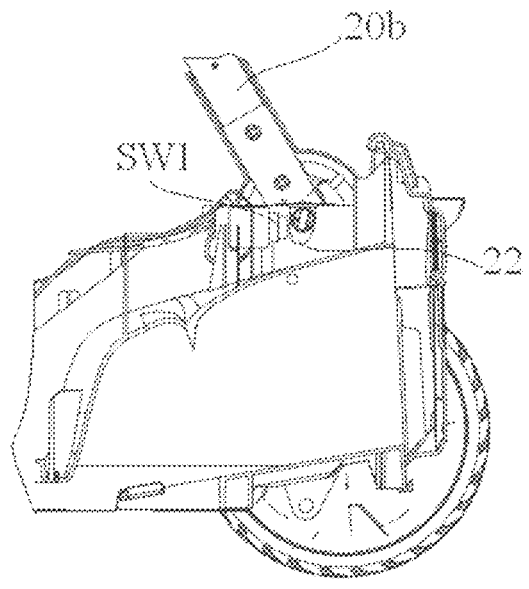
FIG. 8 is a schematic view illustrating that a handle does not rotate to a designated position in the tool of FIG. 1.

Referring to FIG. 2, FIG. 7 and FIG. 8, as a preferred solution, the second control device only comprises a second switch disposed at the rotation shaft of the handle. The second switch is a contact switch SW1 secured to the main body 10. A contact is provided on one side of the second switch towards the rotation shaft 21. A trigger member 22 is provided at a location in the axial direction of the rotation shaft 21 corresponding to the contact switch SW1. When the handle 20 brings the rotation shaft 21 to rotate, the trigger member 22 triggers the contact of the contact switch SW1 when it rotates to a designated angle (generally, when the handle 20 rotates to a designated secure position).

Figure 9:
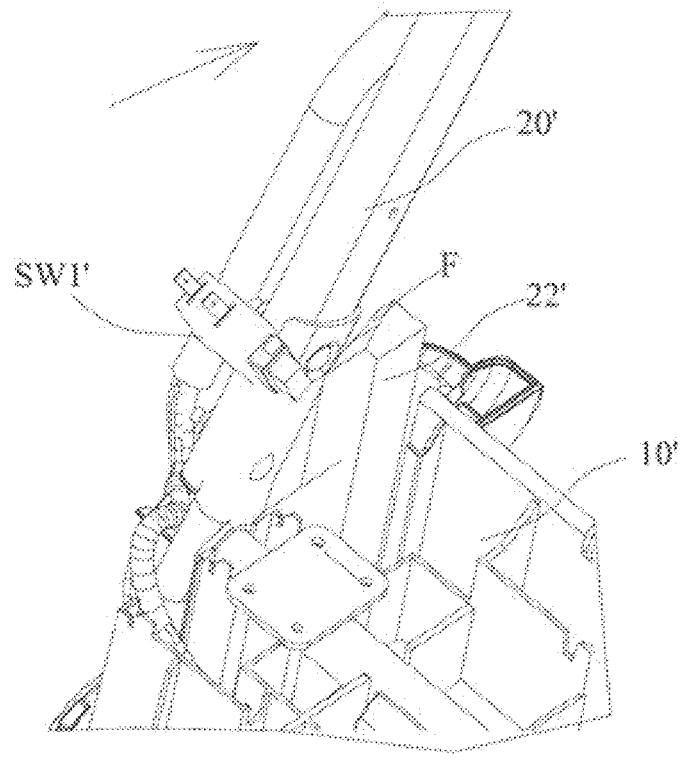
FIG. 9 is a schematic view of a control device also constructed according to the subject disclosure.
Figure 10:
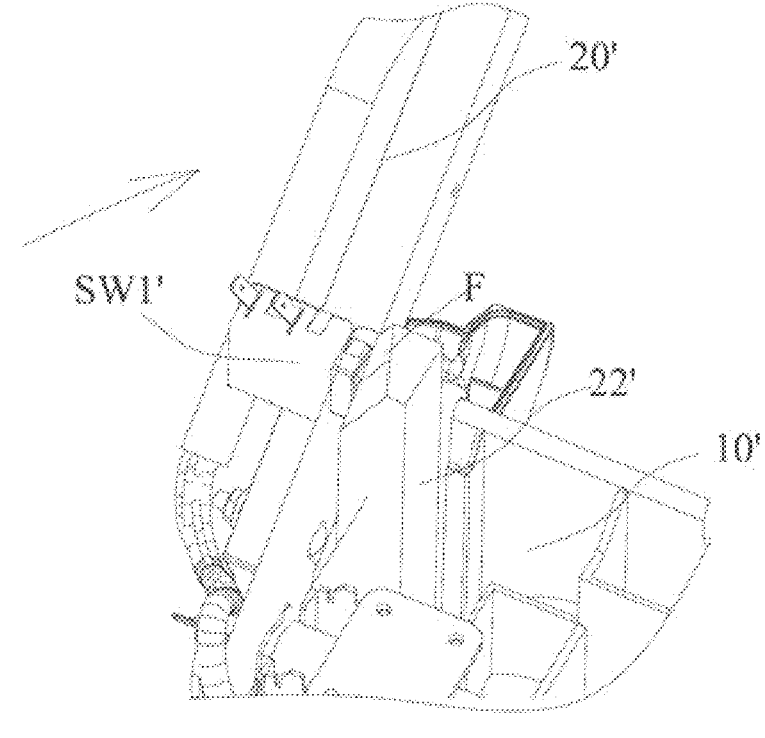
FIG. 10 is a schematic view of the portion shown in FIG. 9 when the handle rotates to a designated position.

As shown in FIG. 9 and FIG. 10, as another preferred solution, the second control device only comprises a second switch disposed at the rotation shaft of the handle. The second switch is a contact switch SW1'. The contact switch SW1' is mounted on the handle 20' and rotates along with it. A contact of the contact switch SW1' faces towards a main body 10'. The main body 10' is provided with a fixed trigger member 22'. A slant surface F is formed on one side of the trigger member 22' opposite to the handle 20'. When the handle 20' rotates, the contact switch SW1' rotates along with it. When the handle 20' rotates to a certain angle, the slant surface F gradually presses the contact of the contact switch SW1' along with the rotation, and when the handle 20' rotates to a designated angle, the slant surface F completely triggers the contact switch SW1'.

When the telescopic situation of the telescopic tube is taken as the risk item to be monitored, the control system further comprises a third control device. The third control device can be controlled by a telescopic action of one telescopic tube 20a. When the telescopic tube extends to a designated position relative to the other telescopic tube, the third control device unlocks the first control device so that the first control device can start the motor, and when the telescopic tube extends to a position other than the designated position, the third control device locks the first control device so that the first control device cannot start the motor.

The third control device comprises a third switch or a third signal source device, wherein the third switch is connected in the power supply circuit, and the third signal source device can send a control signal to the power supply circuit.

Preferably, the third switch is one of a contact switch, a proximity switch, a Hall switch and a photoelectric switch; and the third signal source device is one of a contact switch, a proximity switch, a Hall switch and a photoelectric switch.

Figure 6:
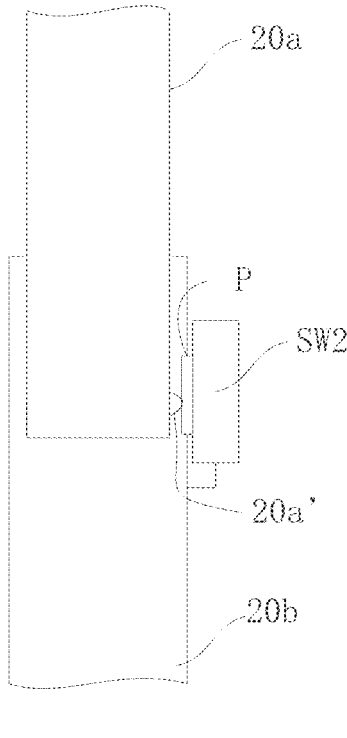
FIG. 6 is a schematic view illustrating that the telescopic tube extends to a designated position in the tool of FIG. 1.

As shown in FIG. 5 and FIG. 6, as a preferred solution, the third control device only comprises a second switch disposed at an end of the telescopic tube 20b. The second switch is a contact switch SW2. The telescopic tube 20b is a sleeve structure. A contact P of the contact switch SW2 penetrates a pipe wall of the telescopic tube 20b and extends into the sleeve structure. The telescopic tube 20a is inserted into the telescopic tube 20b, and a trigger member 20a' is disposed at a bottom end of the telescopic tube 20a. When the telescopic tube 20a is drawn out of the telescopic tube 20b (i.e., when the handle 20 is in an extended state), the trigger member 20a' triggers the contact P of the contact switch SW2 via contact.

Preferably, the contact switch SW, the contact switch SW1 and the contact switch SW2 all are connected in series on the same line of the power supply circuit. When one of the contact switch SW1 and the contact switch SW2 switches off, no matter whether the contact switch SW is triggered by the trigger B to be in an off or on state, the power supply circuit cannot communicate with the line to allow the electric power source to provide electrical energy to the motor, thereby achieving safety protection.

As a preferred solution, in order to prevent the functional accessory from moving due to inertia and thereby causing injury to the user after the motor turns off, the mower 100 further comprises a brake system configured to brake the mowing blade by physical contact. The brake system can brake the functional accessory at least when the control system controls the motor to stop.

Specifically, any one of the control devices controls the motor to turn off, and then the control system controls the brake system to stop the mowing blade from continuing to move due to the inertia, thereby achieving urgent braking. Such braking may be achieved by contacting the mowing blade or by contacting a transmission member fixedly connected thereto.

In the brake system, electrical control of entity devices may be achieved by attraction and release of an electromagnet.

Figure 11:
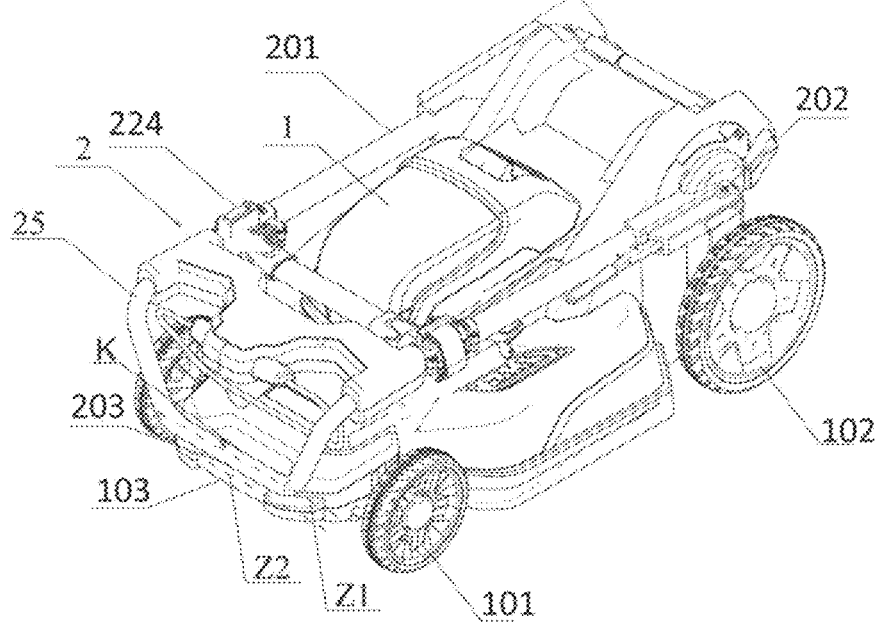
FIG. 11 is a schematic, isometric view showing an exemplary lawncare apparatus constructed according to the description which follows wherein an operating arm is folded.
Figure 12:
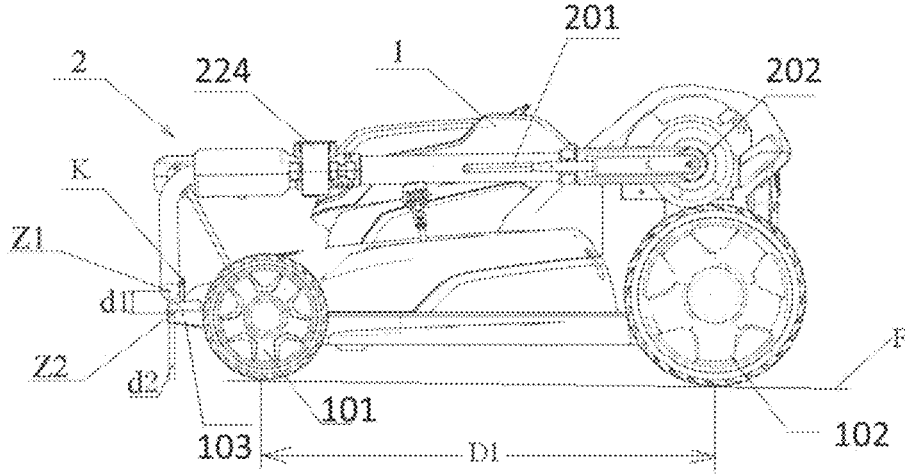
FIG. 12 is a side schematic view showing the exemplary lawncare apparatus of FIG. 11.

Referring to FIG. 11 and FIG. 12, in the illustrated embodiment, the lawncare apparatus is a hand push lawnmower. The lawncare apparatus includes a main body 1, a first pair of wheels 101 and a second pair of wheels 102 supporting the main body 1, a cutting blade disposed in the main body 1, a motor driving the cutting blade, and an operating arm 2 connected to the first end (rear end) of the main body 1. The first pair of wheels 101 and the second pair of wheels 102 are disposed respectively at the second end (front end) and the first end (rear end) of the main body 1. The operating arm 2 is pivotally connected to the rear end of the main body 1 by a pivot shaft 202 and positioned above the second pair of wheels 102. The front end of the main body 1, which is away from the operating arm 2, includes an elongated handle 103. In the illustrated embodiment the elongated handle 103 is substantially cylinder-shaped and includes an axis Z2 along the longitude direction. The operating arm 2 includes a cylindrical gripping portion 203 and can be folded to a folded position, and the cylindrical gripping portion 203 includes an axial central line Z1.

When the operating arm is at the folded position and the first pair of wheels 101 and the second pair of wheels 102 both contact the horizontal surface F, if the gripping portion 203 is above the handle 103, the distance d1 in the vertical direction between the axial central line Z1 and the axis Z2 along the longitude direction is greater than the sum of the radius of the gripping portion 203 and the radius of the cylinder-shaped handle 103, and the distance d1 is less than 5 cm. For example, the diameters of the gripping portion 203 and the cylinder-shaped handle 103 are both 1.5 cm, then the distance d1 is at least greater than 1.5 cm. Preferably, the distance d1 is 3 cm, and a distance d2 in the horizontal direction between the axial central line Z1 and the axis Z2 is also less than 5 cm, and in the illustrated embodiment, the distance d2 is preferably 0.5 cm. Therefore, when the operating arm 2 is at the folded position, the user can grip both the gripping portion 203 and the cylinder-shaped handle 103 conveniently.

Additionally, in an alternative embodiment, to allow the user to grip both the gripping portion 203 and the cylinder-shaped handle 103 more conveniently, the internal profile of the gripping portion 203 is mated with the external profile of the cylinder-shaped handle 103, such that when the operation arm 2 is at the folded position, the outer surface of the gripping portion 203 and the cylinder-shaped handle 103 contact with each other. At this time, the gripping portion 203 and the cylinder-shaped handle 103 can lie in a horizontal plane, the distance d2 in the horizontal direction between the axial central line Z1 and the axis Z2 is larger than the sum of the radius of the gripping portion 203 and the radius of the cylinder-shaped handle 103, and the distance d1 is zero. It should be noted that the external profile of the gripping portion 203 may be designed to mate with the internal profile of the cylinder-shaped handle 103.

To allow the user to grip both the gripping portion 203 and the cylinder-shaped handle 103 more stably, a clip K is disposed on the handle 103. When the operation arm is at the folded position, the clip K is engaged with the cylindrical gripping portion 203.

Further, in the illustrated embodiment, the operating arm 2 is extendable, and a safety switch assembly 240 is disposed in the operating arm 2, the operating arm 2 includes an inner pipe 25 and an outer pipe 201, the outer pipe 201 is rotatably connected to the rear end of the main body 1 by the pivot shaft 202, and the end of the outer pipe 201 includes a pipe sleeve 204.

Figure 13:
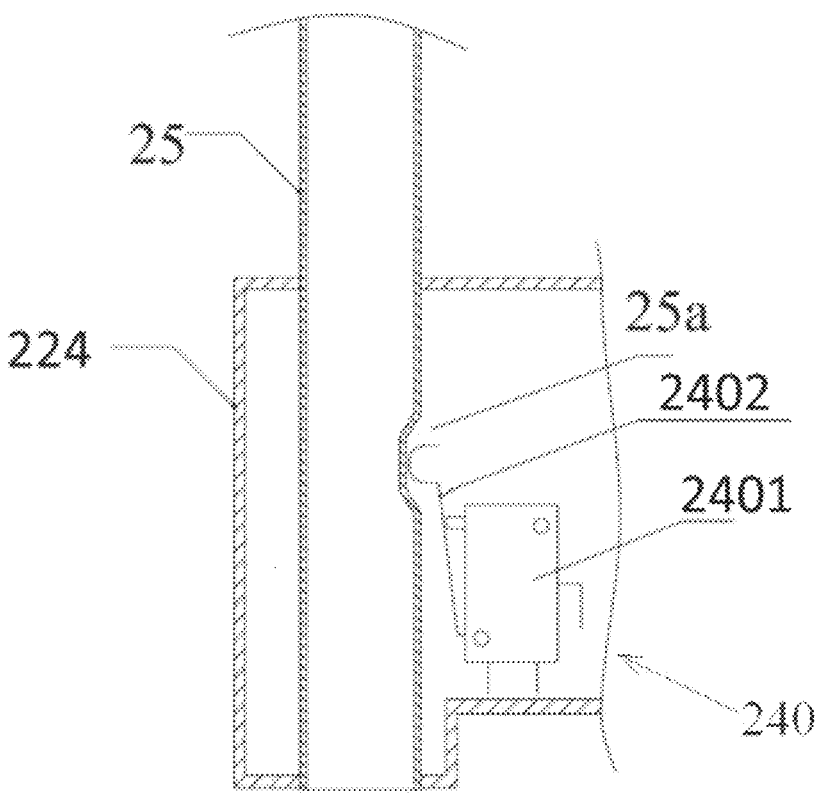
FIG. 13 is a schematic view showing an exemplary safety switch assembly of the lawncare apparatus of FIG. 11.

Referring to FIG. 13, the safety switch assembly 240 is disposed in the sleeve pipe 224 and a safety shift structure 25a is disposed in the inner pipe 25. The safety switch assembly 240 includes a safety switch 2401 and a trigger assembly 2402 configured to trigger the safety switch 2401 when the safety shift structure 25a of the inner pipe 25 is disengaged from a safety location and reset the safety switch 2401 when the safety shift structure 25a returns to the safety location. The safety switch 2401 is electrically connected to a control circuit for controlling the motor in the main body 1.

In the embodiment, the trigger assembly 2402 is a contacting spring sheet. One end of the contacting spring sheet is connected to the safety switch 2401 and the other end is a free end. When the inner pipe 25 slides, the wall of the inner pipe 25 presses the contacting spring sheet to trigger the safety switch 2401. The contacting spring sheet 2402 is formed with elasticity. When the inner pipe 25 slides, the safety shift structure 25a moves back to the safe position and, at this time, the safety shift structure 25a is within a receiving groove configured to accommodate the contacting spring sheet, and the contacting spring sheet 2402 is out of outer force and will not trigger the safety switch 2401.

When the inner pipe 25 is retracted into the outer pipe 201, the safety shift structure 25a leaves the safe position and the wall of the inner pipe 25 presses the contacting spring sheet 2402 to trigger the safety switch. At this time, even during the transporting process, if the user operates the operating switch by mistake, the motor cannot be started, which can reduce the possibility of danger happening to the user.

Figure 14:
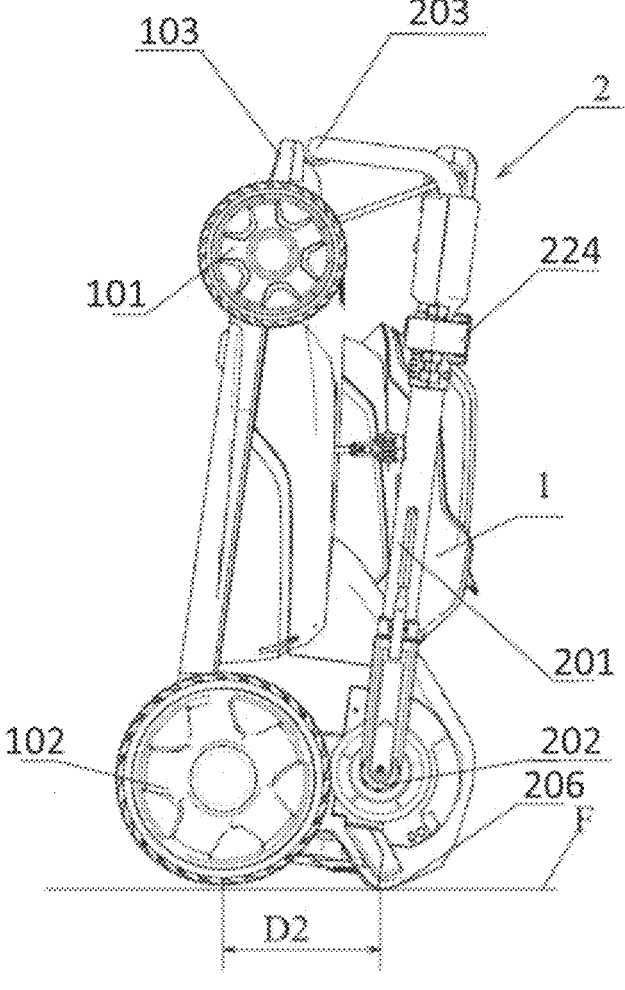
FIG. 14 is a side schematic view showing the lawncare apparatus of FIG. 11 in a storage position.

Additionally, referring to FIG. 12 again, when the lawnmower is at the using position, the first pair wheels 101 and the second pair wheels 102 are supported on the supporting surface F. If light is shining from a direction perpendicular to the supporting surface F, the main body 1 of the lawnmower projects a first orthographic projection on the supporting surface F. Referring to FIG. 14, the lawnmower is at the storage position. When the lawnmower is stored, the lawnmower stands uprightly for storing in a storage room and the operating arm 2 is folded and only the second wheels 2 are supported on the supporting surface F. For improving stability, a supporting portion 206 is disposed on the main body 1 for supporting on the supporting surface F, and the supporting portion can be integrated with or separated from the main body 1. In the same way, at this time if light is shining from a direction perpendicular to the supporting surface F, the main body 1 of the lawnmower projects a second orthographic projection on the supporting surface F. Since the width of the lawnmower at the using position is the same as that of the lawnmower at the storage position, and the distance D1 between the first pair wheels 101 and the second pair wheels 102 is larger than the distance D2 between the first pair of wheels 101 and the supporting portion 206, the first orthographic projection area of the lawnmower at the using position is larger than the second orthographic projection area of the lawnmower at the storage position.

Figure 15:
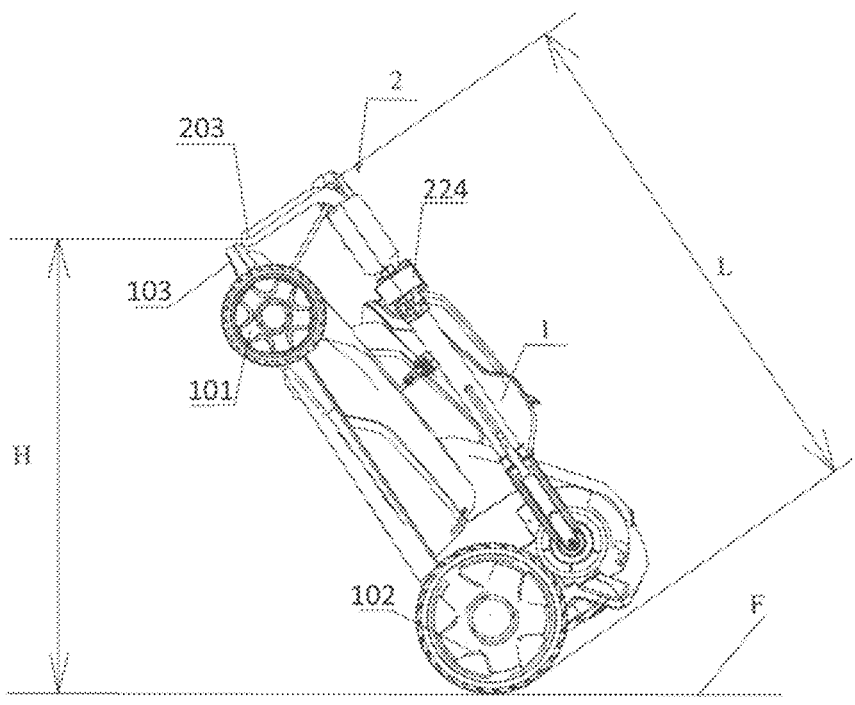
FIG. 15 is a side schematic view showing the lawncare apparatus of FIG. 11 in an obliquely disposed, pulling position.

Referring to FIG. 15, when the lawnmower is changed from the using position to the obliquely pulled position, only the second pair wheels 102 contact the supporting surface and the hands of the user grip a pull portion which is preferably the cylindrical gripping portion 203. At this time, the operating arm 2 is at the folded position, the distance of the gripping portion 203 relative to the supporting surface F is H; the distance of the gripping portion 203 relative to the point the second pairs wheels 102 contacting the supporting surface F is L, and the ratio of H to L may be 0.5~1, preferably 0.8~0.09, for meeting the needs of ergonomics. Therefore, when pulling the lawnmower, only part of the weight of the lawnmower is supported by the user, which makes the user feel more labor-saving.

From the above, the described lawncare apparatus can be pulled obliquely, and because of the structure mate relationship between the operating arm and the cylindrical gripping portion, the user can feel more comfortable during transporting and the pulling process is more stable, so that the volume of the lawncare apparatus during transporting is reduced and the operability of lawnmower pulling is improved. Since a safety switch mechanism is disposed on the operating arm, misoperation of the lawncare apparatus can be avoided and safety of pulling is improved.

The above illustrates and describes basic principles, main features and advantages of the present invention. Those skilled in the art should appreciate that the above embodiments do not limit the present invention in any form. Technical solutions obtained by equivalent substitution or equivalent variations all fall within the scope of the present invention.

What is claimed is:

1. A mower, comprising
a main body;
a handle comprising a first connecting rod connected to the main body, a second connecting rod connected to the main body, a grip portion connected to both the first connecting rod and the second connecting rod at a rear end of the handle and extending therebetween, and a connection device comprising a transverse connection portion connecting the first connecting rod and the second connecting rod extending between the first connecting rod and the second connecting rod and being separate from the grip portion and proximately located to the grip portion and a lateral protrusion portion extending from the transverse connection portion;
a switch, capable of starting the mower, mounted to the connection device; and
a trigger pivotally mounted to the lateral protrusion portion and operably coupled to the switch, the trigger being pivotally to trigger the switch.

2. The mower according to claim 1, wherein the first connecting rod and the second connecting rod are rotatably connected to the main body through a rotation shaft.

3. The mower according to claim 2, further comprising: a second switch mounted to the main body and a trigger member configured to trigger the second switch, wherein the trigger member triggers the second switch when the handle rotates to a working position.

4. The mower according to claim 3, wherein the trigger member moves away from the second switch when the handle rotates to a non-working position.

5. The mower according to claim 3, further comprising: a blade, a motor configured to drive the blade, and a control circuit for controlling the motor, wherein the second switch is connected in series in the control circuit.

6. The mower according to claim 1, further comprising: a control circuit for controlling the mower, wherein the switch is connected in series in the control circuit.

7. The mower according to claim 1, wherein the switch is a contact switch.

8. The mower according to claim 1, wherein the switch is a proximity switch, a Hall switch, or a photoelectric switch.

9. The mower according to claim 1, further comprising: a motor, and a power supply circuit for transmitting electrical energy to the motor, wherein the switch is capable of sending a control signal to the power supply circuit.

10. The mower according to claim 1, wherein the trigger is pivotally mounted to the lateral protrusion portion of the transverse connection portion.

11. A walking behind power tool, comprising:
a main body;
a handle comprising a first connecting rod connected to the main body, a second connecting rod connected to the main body, a grip portion connected to both the first connecting rod and the second connecting rod, and a T-shaped connection device connecting the first connecting rod and the second connecting rod extending between the first connecting rod and the second connecting rod and being separate from the grip portion and proximately located to the grip portion;
a motor;
a switch mounted to the T-shaped connection device and electrically coupled to the motor and a power supply to control whether an operating power from the power supply is supplied to the motor; and
a trigger pivotally mounted to the T-shaped connection device and operably coupled to the switch, the trigger being pivotally operable to trigger the switch, mounted to the T-shaped connection device.

12. The walking behind power tool according to claim 11, further comprising: a control circuit for controlling the motor, wherein the switch is connected in series in the control circuit.

13. The walking behind power tool according to claim 11, wherein the switch is a contact switch.

14. The walking behind power tool according to claim 11, wherein the switch is a proximity switch, a Hall switch, or a photoelectric switch.

15. The walking behind power tool according to claim 11, further comprising: a power supply circuit for transmitting electrical energy to the motor, wherein the switch is capable of sending a control signal to the power supply circuit.

16. A mower, comprising:
a main body comprising a motor and a mowing blade;
a handle comprising a first connecting rod connected to the main body, a second connecting rod connected to the main body, a grip portion connected to both the first connecting rod and the second connecting rod at a rear end of the handle and extending therebetween, a connection device comprising a transverse connection portion connecting the first connecting rod and the second connecting rod extending between the first connecting rod and the second connecting rod and being separate from the grip portion and proximately located to the grip portion and a lateral protrusion portion extending backward from the transverse connection portion;
a trigger pivotally mounted to the lateral protrusion portion and pivotally operable to start or stop the motor, and disposed at a front side of the grip portion; and
a switch electrically coupled to the trigger and the motor, the switch being controlled by the trigger.

17. The mower according to claim 16, further comprising: a control circuit for controlling the motor, wherein the switch is connected in series in the control circuit.

18. The mower according to claim 16, wherein the switch is a contact switch.

19. The mower according to claim 16, wherein the switch is a proximity switch, a Hall switch, or a photoelectric switch.

20. The mower according to claim 16, further comprising: a power supply circuit for transmitting electrical energy to the motor, wherein the switch is capable of sending a control signal to the power supply circuit.

* * * * *